United States Patent

[11] 3,603,814

[72] Inventor Shin-ichi Ohashi
Kodaira-shi, Japan

[21] Appl. No. 811,105
[22] Filed Mar. 27, 1969
[45] Patented Sept. 7, 1971
[73] Assignee Hitachi, Ltd.
Tokyo, Japan
[32] Priority Apr. 10, 1968
[33] Japan
[31] 43/23362

[54] SERIES-SHUNT TYPE SEMICONDUCTOR CHOPPER
5 Claims, 22 Drawing Figs.

[52] U.S. Cl. .......................................... 307/240,
307/241, 307/251, 307/262, 328/162
[51] Int. Cl. .......................................... H03k 17/16,
H03k 17/60
[50] Field of Search .......................................... 307/240,
251, 304, 241, 262

[56] References Cited

UNITED STATES PATENTS

| | | | |
|---|---|---|---|
| 3,386,053 | 5/1968 | Priddy .......................... | 307/251 X |
| 3,517,213 | 6/1970 | Britton .......................... | 307/251 X |

OTHER REFERENCES

Airpax Bulletin, " Chopper," Bulletin C-126, June 1967 (Copy enclosed).

*Primary Examiner*—John S. Heyman
*Attorney*—Craig, Antonelli & Hill

ABSTRACT: A series-shunt type semiconductor chopper comprising two switching elements which are excited so as to be rendered conductive for a predetermined period of time when they have their conductivities changed, respectively.

INVENTOR
SHIN-ICHI OHASHI

BY Craig, Antonelli, Stewart & Hill
ATTORNEYS

INVENTOR
SHIN ICHI OHNISHI

BY Craig, Antonelli, Stewart & Hill
ATTORNEYS

INVENTOR
SHIN ICHI OHASHI

BY Craig, Antonelli, Stewart & Hill

ATTORNEYS

INVENTOR
SHIN ICHI OHASHI

BY Craig, Antonelli, Stewart & Hill
ATTORNEYS

SERIES-SHUNT TYPE SEMICONDUCTOR CHOPPER

This invention relates to a semiconductor chopper using field effect transistors, and more particularly it pertains to a semiconductor chopper which is so designed that spike noise can be greatly reduced.

Generally, in a semiconductor chopper using field effect transistors as switching elements, these transistors are switched from the nonconductive (OFF) state to the conductive (ON) state and vice versa with excitation voltages of rectangular waveform. When the transistors are switched as described above, said rectangular waveform voltages are differentiated by the interelectrode capacitances present in the transistors per se, so that there inevitably occurs so-called spike noise.

Involved in the prior art are such difficulties that due to the occurrence of such spike noise, the upper limit of the excitation frequency for said switching elements is restricted so that the widening of the frequency band cannot be achieved or an offset voltage is produced or that drift is caused due to variations in the magnitude of said spike noise with variations in the ambient temperature. It has been desired to overcome the aforementioned difficulties.

It is a primary object of the present invention to provide a series-shunt type chopper which is so designed that spike noise can be greatly reduced, thereby overcoming the aforementioned difficulties.

The foregoing object of the present invention may be accomplished in a series-shunt type semiconductor chopper using field effect transistors as switching elements, which comprises an excitation source adapted to excite the switching elements in such a manner that when one of the switching elements is excited from the OFF state into the ON state, the other switching element is still in the ON state so that these switching elements are maintained in the ON state together for a predetermined period of time.

Other objects, features and advantages of the present invention will become apparent from the following description taken in conjunction with the accompanying drawings, in which:

FIGS. 1*a* and 1*b* are views for explaining spike noise;

Figures 7A, 7B, 7C:
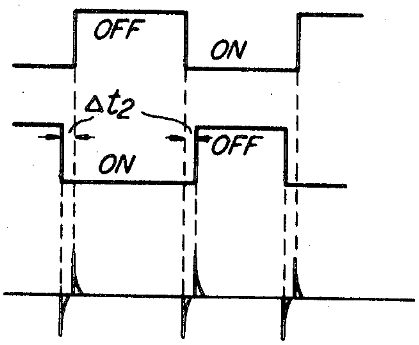
Figure 8:
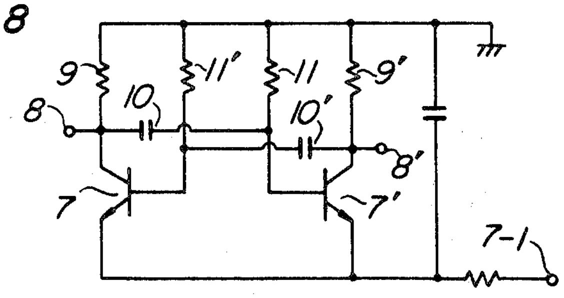
Figures 9A, 9B:
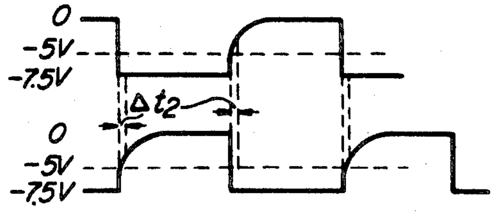
Figure 10:
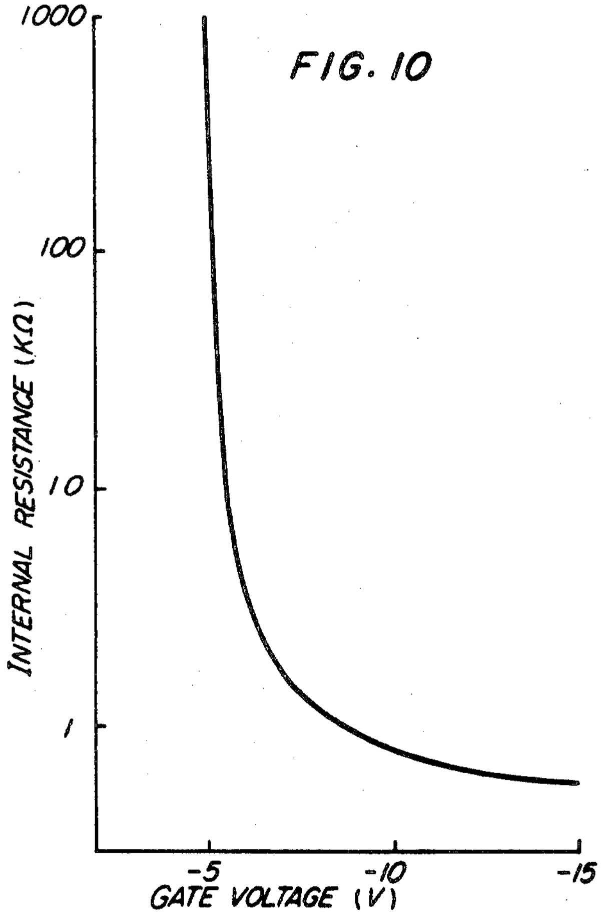
Figure 11:
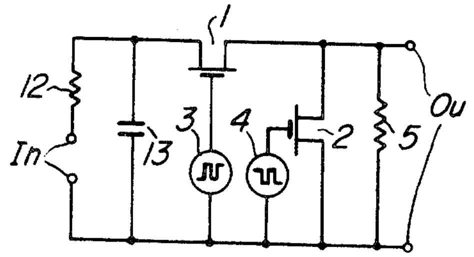
Figure 12:
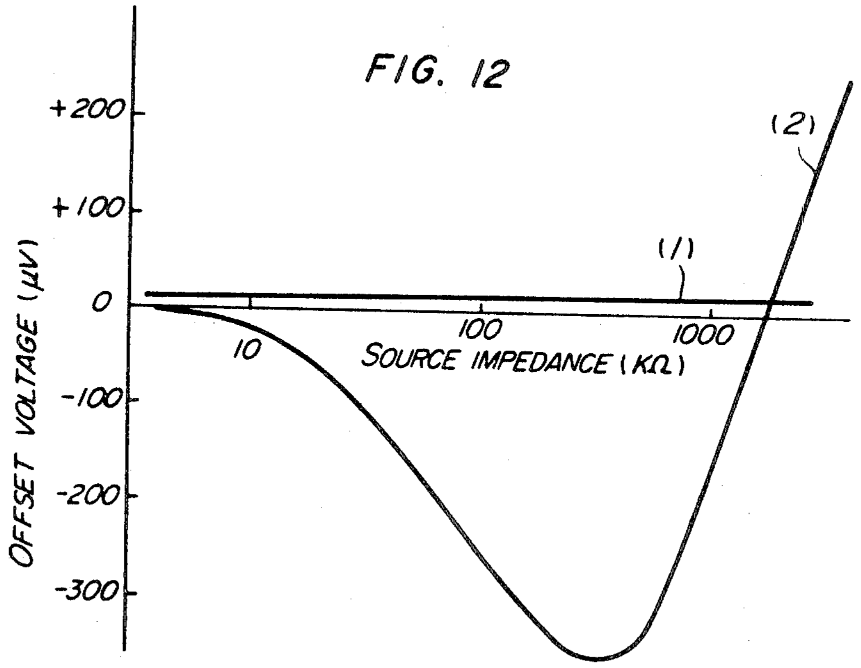

FIGS. 4*a*, 4*b* and 4*c*, 5*a* and 5*b*, and 6*a* to 6*d* are views showing waveforms useful for explaining the present invention respectively;

FIGS. 7*a* to 7*c* are views shown excitation voltage waveforms useful for explaining the principle of the present invention respectively;

FIG. 8 is a view showing a multivibrator which may be used in the present invention;

FIGS. 9*a* and 9*b* are views showing the output voltage waveforms of the multivibrator respectively;

FIG. 10 is a view showing the internal resistance characteristics of a P-channel insulated gate field effect transistor which may be used in the present invention;

FIG. 11 is a schematic circuit diagram showing the semiconductor chopper according to an embodiment of the present invention; and FIG. 12 is a view showing the source impedance vs. offset voltage characteristics thereof.

Figure 1A:
Figure 1B:
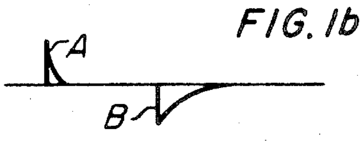

Referring to FIGS. 1*a* and 1*b*, description will first be made of spike noise.

As described above, in the case of a semiconductor chopper using field effect transistors as switching elements, these transistors are switched from the OFF state to the ON state and vice versa by means of an excitation voltage of rectangular waveform such as shown in FIG. 1*a*. During the switching operation, the rectangular waveform voltage is differentiated by the capacitances between the electrodes of the transistors per se when the latter are switched from "OFF" to "ON" and vice versa, thus resulting in spike noise such as indicated at A and B in FIG. 1*b*. A and B represent spike noises in which A occurs when each transistor is switched from the OFF state to the ON state and B occurs when the transistor is switched from the ON state to the OFF state, respectively. As will be seen also from the drawing, such spike noise wave has a different area between when the transistors are switched from the OFF state to the ON state and when they are switched from the ON state to the OFF state, since the noise is varied with the "ON" resistance and "OFF" resistance.

Figure 2:
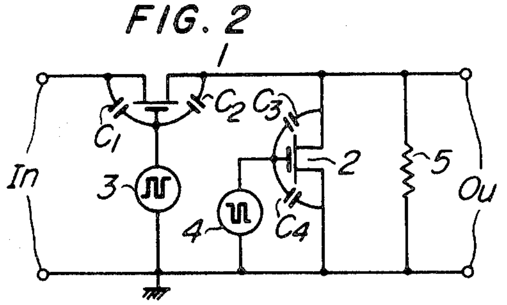
FIG. 2 is a schematic circuit diagram showing the conventional series-shunt semiconductor chopper.

Thus, such noise occurs even in such a series-shunt chopper as shown in FIG. 2 using insulated gate type field effect transistors (referred to as MOS transistors hereinafter) as the aforementioned switching elements for example. More specifically, in this chopper, MOS transistors 1 and 2 connected in series and parallel with each other are alternately excited into the ON state and the OFF state by rectangular waveform voltages opposite in their phase to each other available from excitation power sources 3 and 4 respectively. Thus, a DC input signal applied to input terminals $I_n$ is modulated into an AC output signal. In this case, spike noise is caused by interelectrode capacitances $C_1$, $C_2$ and $C_3$ present in the MOS transistors 1 and 2, and they are superposed upon the output signal appearing at output terminals $O_u$. It is to be noted however that spike noise due to the interelectrode capacitance $C_4$ is not superposed upon the output signal since the same is short-circuited by a closed loop constituted by the interelectrode capacitance $C_4$ and power source 4. Numeral 5 represents the output resistance, and the DC source impedance is negligibly small as compared with the "ON" resistance of the aforementioned MOS transistors 1 and 2.

Figure 3:
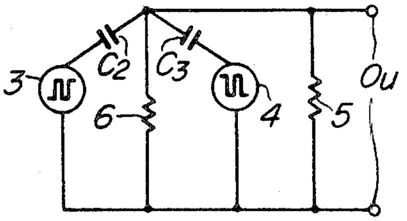
FIG. 3 is an equivalent circuit of said conventional chopper.

In the series-shunt chopper described above, it may be considered that the MOS transistor 1 is grounded at the side of the input terminal $I_n$ with respect to the aforementioned spike noise, with the signal source impedance being neglected. This is equivalent to a parallel connection of the MOS transistors 1 and 2. Thus, as far as the aforementioned spike noise is concerned, the circuit of FIG. 2 may be substituted by such a circuit as shown in FIG. 3 wherein numeral 6 represents a parallel connection of the channel resistances of the MOS transistors 1 and 2. Therefore, only the interelectrode capacitances $C_1$ and $C_2$ become the causes for the occurrence of the aforementioned spike noise. As a result, spike currents flowing through the interelectrode capacitances $C_2$ and $C_3$ are caused to flow through the load resistance 5 in opposite directions so as to be cancelled by each other so that a very low spike voltage is available at the output terminals $O_u$. Thus, it may be considered that essentially the aforementioned series-shunt chopper circuit effectively reduces spike noise.

In actuality, however, spike noise cannot be reduced to the expected extent even by using a series-shunt chopper circuit as semiconductor chopper circuit.

The present inventor has examined the causes for this. As a result, it has been found that the aforementioned spike noise reducing operation corresponds to an idealized form of the operation of a series-shunt chopper using MOS transistors, and that in practice there is a tendency that the aforementioned spike currents are not completely cancelling out each other due to the presence of a slight phase difference between rectangular waveform voltage applied to excite the MOS transistors and a delay in response of these MOS transistors which raises a critical problem, with the result that there inevitably occurs spike noise.

Figures 4A, 4B, 4C, 5A, 5B:
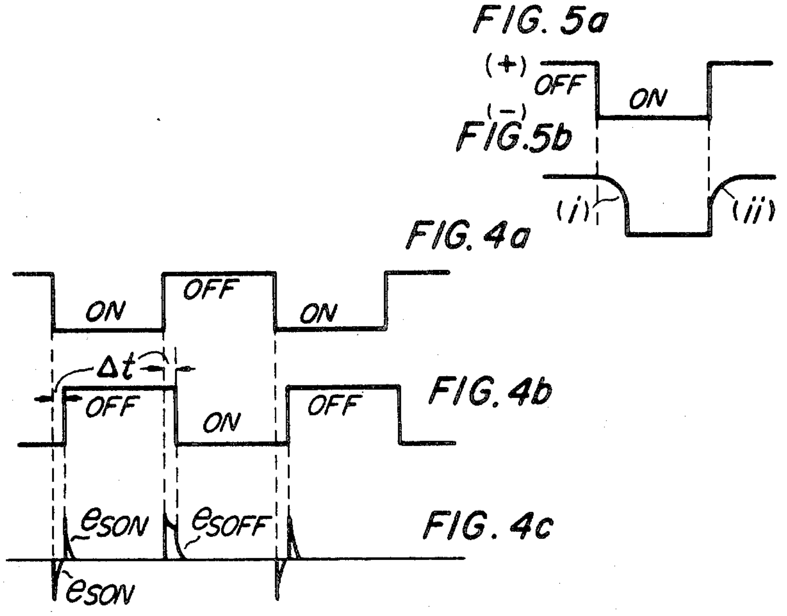

This will be described in detail below. Assume that the MOS transistors 1 and 2 shown in FIG. 2 are excited by rectangular waveform voltages with a phase difference $\Delta t$ therebetween such as shown in FIGS. 4*a* and 4*b* which are available from the excitation power sources 3 and 4 respectively. When the MOS transistor 1 is excited into the ON state, the other MOS transistor 2 is still in the ON state but it is excited into the OFF state after $\Delta t$ from the time when the former transistor was excited. On the other hand, when the MOS transistor 1 is excited into the OFF state, the MOS transistor 2 is still in the OFF state but it is excited into the ON state after $\Delta t$ from the time when the former transistor was excited. Thus, the MOS transistors 1 and 2 assume the ON or OFF state together during the period of time $\Delta t$. Especially in the case where these transistors are in the OFF state together, the resulting spike voltage $e_{SOFF}$ is attenuated in accordance with a time constant defined by the OFF resistance of the MOS transistor 1 and the ON resistance of the MOS transistor 2, thus resulting in a pulselike waveform having a width of $\Delta t$ as shown in FIG. 4*c*. On the other hand, when the MOS transistors 1 and 2 are in the ON state together, there occurs a spike voltage $e_{SON}$ having such a waveform as shown in FIG. 4*c* which varies in accordance with a relatively small time constant defined by the ON resistances of these transistors.

As described above, spike voltages produced by exciting the aforementioned MOS transistors by means of excitation voltages with a phase shift therebetween have different areas. Thus, it is impossible to eliminate such spike voltages unless they have equal areas so as to be completely cancelled out by each other.

Figures 6A, 6B, 6C, 6D:
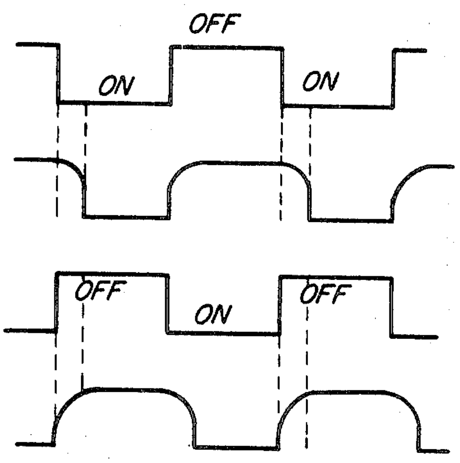

Furthermore, the time-lag of response of each of the MOS transistors enters the picture in addition to the aforementioned phase difference, whereby the transistors are caused to assume the OFF state together. Such time-lag of response stems essentially from the presence of a capacitance $C_G$ between the gate electrode and the channel of the MOS transistor. As is well known in the art, the MOS transistor has the channel conductivity thereof controlled in accordance with the amount of electric charge induced at the gate. Assume that a rectangular waveform voltage such as shown in FIG. 5*a* is applied between the gate and the source of a P-channel type MOS transistor, for example. Then, the resistance is changed from "OFF" to "ON" with the change of this voltage in the negative direction. At first, there is a relatively large time constant because the aforementioned electric charge is induced in the capacitance $C_G$ through the channel resistance which assumes a high value, but as the channel resistance becomes less, the capacitance is acceleratingly charged so that the time constant becomes smaller accordingly. Thus, such time-lag as indicated at (*i*) in FIG. 5*b* occurs in the response of the channel resistance to the voltage applied between the gate and the source. On the other hand, with the change of the aforementioned voltage in the positive direction, the channel resistance is changed from "ON" to "OFF," so that the capacitance $C_G$ is quickly charged through the channel resistance of a low value at first and then slowly through the channel resistance which is gradually increased. Consequently, the response of the channel resistance to the applied voltage turns out to be as shown at (*ii*) in FIG. 5*b*. Hence, even if the MOS transistors 1 and 2 of the aforementioned series-shunt chopper are excited with rectangular waveform voltages which are opposite in their phase to each other and have no phase lag therebetween as shown in FIGS. 6*a* and 6*c* respectively, the channel resistances of the MOS transistors 1 and 2 change as shown in FIGS. 6*b* and 6*d* respectively. As will be seen from these figures, the MOS transistors 1 and 2 are not responsive to the applied rectangular waveform voltages due to a time-lag respectively. In fact, there occurs a period of time during which these transistors are caused to be in their OFF state together when the rectangular waveform voltages are switched from the ON state to the OFF state vice versa, respectively, so that spike currents are produced with high time constants defined by the interelectrode capacitances $C_2$ and $C_3$ and a high resistance respectively, and when either one of the MOS transistors is rendered conductive, the spike currents are quickly attenuated with low time constants defined by said capacitances and a low resistance respectively. Thus, both of the MOS transistors 1 and 2 are maintained in the OFF state during the time when such spike currents flow.

As described above, due to the fact that there is the period of time during which both of the MOS transistors are in the OFF state, spike currents having a large area are produced so that even if these spike currents are caused to flow in such directions as to be cancelled by each other, there occurs a difference between these currents, thus resulting in an excessive spike voltage.

The present invention is intended to eliminate the aforementioned drawbacks. Description will now be made of the operational principle, operation and effect of the present invention with reference to the drawings.

FIGS. 7*a* and 7*b* show excitation voltage waveforms useful for explaining the operation principle of the present invention respectively, from which it will be seen that time difference $\Delta t_2$ are provided between the waveform shown in FIG. 7*b* and that shown in FIG. 7*a* so that the former results in a longer conducting period as compared with the latter. Thus, due to such time differences, the aforementioned switching elements are shifted in respect of excitation period when they are excited with the excitation voltages. Assume that the first switching element is excited with the rectangular waveform voltage shown in FIG. 7*a* while the second switching element is excited with the rectangular waveform shown in FIG. 7*b*. Then, the first switching element is still in the ON state when the second switching element is switched from the OFF state to the ON state, and the second switching element is still in the ON state when the first switching element is switched from the OFF state to the ON state. Thus, these switching elements are in the ON state together at the time when they have their conductivities changed so that there occurs no period of time during which these elements are in the OFF state together. Consequently, even if the aforementioned time-lag of response occurs (naturally there is no phase difference between the aforementioned excitation voltages), the spike current from the first switching element is attenuated in accordance with the ON resistance of the second switching element, and the spike current from the second switching element is attenuated in accordance with the ON resistance of the first switching element. Thus, the overall current has such a magnitude as shown in FIG. 7*c* so that the area of the spike voltages is greatly reduced as compared with the case described above in connection with FIG. 4. Thus, the spike currents of a substantially equal area are cancelled out by each other, with the result that the resulting spike voltage is remarkably reduced.

FIG. 8 shows a multivibrator circuit adapted to provide excitation voltages with the aforementioned time difference $\Delta t_2$, wherein use is made of NPN transistors 7 and 7′ having the collector electrodes grounded, and a negative source voltage having a magnitude of 24 v. is applied to the emitter electrodes of these transistors through a power source terminal 7–1. Numerals 8 and 8′ represent output terminals at which are obtained rectangular waveform voltages which are opposite in their phase to each other, 9 and 9′ resistance elements of 2 kΩ, 10 and 10′ capacitors of 0.0047 μf. and 11 and 11′ resistance elements of 100 kΩ. As is well known in the art, the aforementioned rectangular waveform voltages opposite in their phase to each other are generated as a result of the repetitive operation that the transistors 7 and 7′ are alternately rendered conductive or nonconductive.

FIGS. 9*a* and 9*b* show the voltage waveforms opposite in their phase to each other which are available at the output terminals 8 and 8′ of the aforementioned multivibrator circuit. These voltages are of a value of −7.5 v. The cyclic period thereof depends upon the values of the resistance element 11 and capacitor 10 (resistance element 11′ and capacitor 10′), and thus the frequency of said voltages is about 1 kHz. Furthermore, the rising characteristics of these waveforms depend upon the values of the resistance element 9 and capacitor 10 (resistance element 9′ and capacitor 10′), and thus the rising time constant turns out to be 9.4 μ seconds.

Thus, by making use of the gentle rising characteristics and extremely steep rising characteristics of the respective waveforms per se, it is possible to provide a phase difference or time difference $\Delta t_2$ between the voltage waveforms. In FIGS. 9*a* and 9*b*, the dotted line indicates the threshold level at which the first and second switching elements are switched from the ON state to the OFF state and vice versa, respectively. (Assume that the first and second switching elements are constituted by P-channel enhancement type MOS transistors. Then, the internal resistance characteristics of these switching elements are such that they are switched from the ON state to the OFF state and vice versa at a gate voltage of about −5 to −6 v. Thus, the MOS transistors are excited into the OFF state and ON state with voltages above and below the dotted line.) However, since the rising characteristics are varied slowly and the falling characteristics are changed rapidly in accordance with the corresponding time constant, there occurs a time difference of $\Delta t_2$ between the time in which the threshold level is reached when the waveform is rising and the time in which the threshold level is reached when the waveform is falling. In accordance with the present invention, the aforementioned multivibrator circuit uses a power source voltage of −24 v., resistance element 9 of 2 kΩ, capacitor 10 of 0.0047 μf. and resistance element of 100 kΩ. Thus, $\Delta t_2$ becomes 7.5 μ seconds when the cyclic period of the waveform is about 1 millisecond.

In the series-shunt type chopper as shown in FIG. 2, therefore, such excitation voltages as shown in FIGS. 9*a* and 9*b* are applied to the gate electrodes of the MOS transistors 1 and 2 respectively, when the excitation power sources 3 and 4 for the MOS transistors 1 and 2 are constituted by the aforementioned multivibrator. Thus, there occurs an infinitesimal period of time $\Delta t_2$ during which the MOS transistors 1 and 2 are in the ON state together, so that the spike voltage can be made very low as described above.

In the foregoing, description has been made of the case where the signal source impedance is sufficiently lower than the ON resistance of each switching element to be neglected. It is to be noted however that the present invention is by no means limited to such case but that it may also equally be applied to applications in which the aforementioned signal source impedance is not negligible.

With a series-shunt type chopper, a spike current flowing in a signal source cannot be neglected in case the impedance of the signal source is high as compared with the ON resistance of each switching element. Therefore, it has heretofore been the usual practice that a capacitor 13 is connected in parallel with signal source impedance 12 at the input side of the series-shunt type chopper thereby to bypass a spike current tending to flow into the signal source, as shown in FIG. 1, wherein parts corresponding to those of FIG. 2 are indicated by like reference numerals and symbols.

In accordance with the present invention, in such arrangement, too, such excitation voltages as shown in FIGS. 9*a* and 9*b* are imparted to the gate electrodes of the MOS transistors 1 and 2 of the series-shunt type chopper shown in FIG. 11 respectively in the case where the excitation power sources 3 and 4 for the MOS transistors 1 and 2 are constituted by the aforementioned multivibrator circuit. Thus, there occurs an infinitesimal period of time $\Delta t_2$ during which the MOS transistors 1 and 2 are rendered conductive together, so that the spike voltage can be greatly reduced.

FIG. 12 is a view showing semilogarithmic graphs which represent the relationships between a voltage developed across the capacitor 13 with a spike current or offset voltage and the signal source impedance in case the signal source impedance cannot be neglected, wherein the straight line 1 corresponds to the case where the present invention was applied and the curve 2 corresponds to the case of a conventional device of this type. The capacitor 13 has a value of 1 μf. As will be seen from this Figure, if the signal source impedance is 100 kΩ for example, then the offset voltage resulting from a spike current can be reduced to one-fiftieth or less.

With the conventional device, spike noise cannot be completely eliminated, and in case the signal source impedance is several 10 kΩ or higher and the excitation frequency is several kHz. or higher, there occurs remarkable spike noise. This constitutes restrictions on the widening of the frequency band. In accordance with the present invention, it is possible to obtain a semiconductor chopper wherein the signal source impedance and excitation frequency may be as high as several 100 kΩ and several 100 kHz. or higher.

Although, in the foregoing, description has been made of the case where the field effect transistors were of the P-channel insulated gate type, it will be readily apparent to those skilled in the art that the present invention can also equally be applied to the use of N-channel or junction type field effect transistors.

What is claimed is:

1. A series-shunt type semiconductor chopper comprising:
two field effect transistors effectively connected in parallel in a DC sense and effectively connected in series in an AC sense, so as to form a pair of switching elements:
an excitation source connected to said field effect transistors, for rendering each of said transistors alternately conductive and nonconductive respectively, including means for rendering each of transistors conductive a predetermined period of time prior to rendering the other of said transistors nonconductive during the alternate excitation of said transistors, whereby switching spikes at the output of said chopper will be substantially eliminated.

2. A series-shunt type semiconductor chopper according to claim 1, wherein a capacitor is connected in parallel with an input thereto to thereby bypass spike noise tending to flow in the input.

3. A series-shunt type semiconductor chopper according to claim 1, wherein said excitation source comprises:
a switching voltage circuit having a pair of output terminals which produces at each of said output terminals a voltage which renders one of said field effect transistors, connected thereto alternately conductive and nonconductive, and wherein the transient portion of said voltage which renders said field effect transistor conductive has a shorter time constant relative to the portion of said voltage which renders said transistor nonconductive.

4. A series-shunt type semiconductor chopper according to claim 3, wherein said switching voltage circuit comprises a bistable multivibrator, the cyclic period of which is controlled by respective resistance and capacitance elements therein, said resistance and capacitance elements having preselected time constants to provide said predetermined period of time between the rendering of each of said field effect transistors conductive and nonconductive, each of said field effect transistors being voltage threshold sensitive, whereby there is a time delay between the instant each one of said switching elements previously in its nonconductive state switches into its conductive state by the application thereto of a first portion of said switching voltage which reaches the threshold during said relatively short transient portion and the instant when the other switching element previously in its conductive state switches into its nonconductive state by application thereto of a second portion of said switching voltage which reaches said threshold varying the relatively slower transient portion of said voltage.

5. A series-shunt type semiconductor chopper comprising:
a pair of input terminals and a pair of output terminals;
a first field effect transistor and a second field effect transistor, the first field effect transistor being connected in series with one of said input terminals and one of said output terminals, and the second of said field effect transistors being connected in parallel with said pair of output terminals;
an excitation source connected to each of said field effect transistors, for rendering each of said transistors alternately conductive and nonconductive respectively, including means for rendering each of said transistors conductive a predetermined period of time prior to rendering the other of said transistors nonconductive during the alternate excitation of said transistors, whereby switching spikes at the output of said chopper will be substantially eliminated.